S. A. RIDDICK.
FLOOR PLATE AND SHUTTER FOR SAME FOR AUTOMOBILES.
APPLICATION FILED FEB. 16, 1921.

1,413,426.

Patented Apr. 18, 1922.

Inventor
Samuel A. Riddick
By Shepherd & Campbell
Attorneys

UNITED STATES PATENT OFFICE.

SAMUEL A. RIDDICK, OF NORFOLK, VIRGINIA.

FLOOR PLATE AND SHUTTER FOR SAME FOR AUTOMOBILES.

1,413,426.  Specification of Letters Patent.  Patented Apr. 18, 1922.

Application filed February 16, 1921. Serial No. 445,414.

*To all whom it may concern:*

Be it known that I, SAMUEL A. RIDDICK, a citizen of the United States, residing at Norfolk, in the county of Norfolk and State of Virginia, have invented certain new and useful Improvements in Floor Plates and Shutters for Same for Automobiles, of which the following is a specification, reference being had therein to the accompanying drawings.

The object of the present invention is to provide an automatically operable closure arranged to be moved to position to close the slot through which the emergency brake and clutch control lever of a Ford automobile operates, when said lever is moved into forward position, or the position it occupies when the machine is running, to thereby prevent blasts of cold air from entering the body of the car.

It is a further object of the invention to provide a closure of the character above indicated which will be exceedingly simple in construction and consequently very economical to manufacture. It is a further object of the invention to so arrange the parts that the device may be made as an article of manufacture and sold as an accessory to be substituted for the usual slotted plate ordinarily found upon the Ford car and through which the emergency brake operates.

Further objects and advantages of the invention will be set forth in the detailed description which follows.

Figure 1:
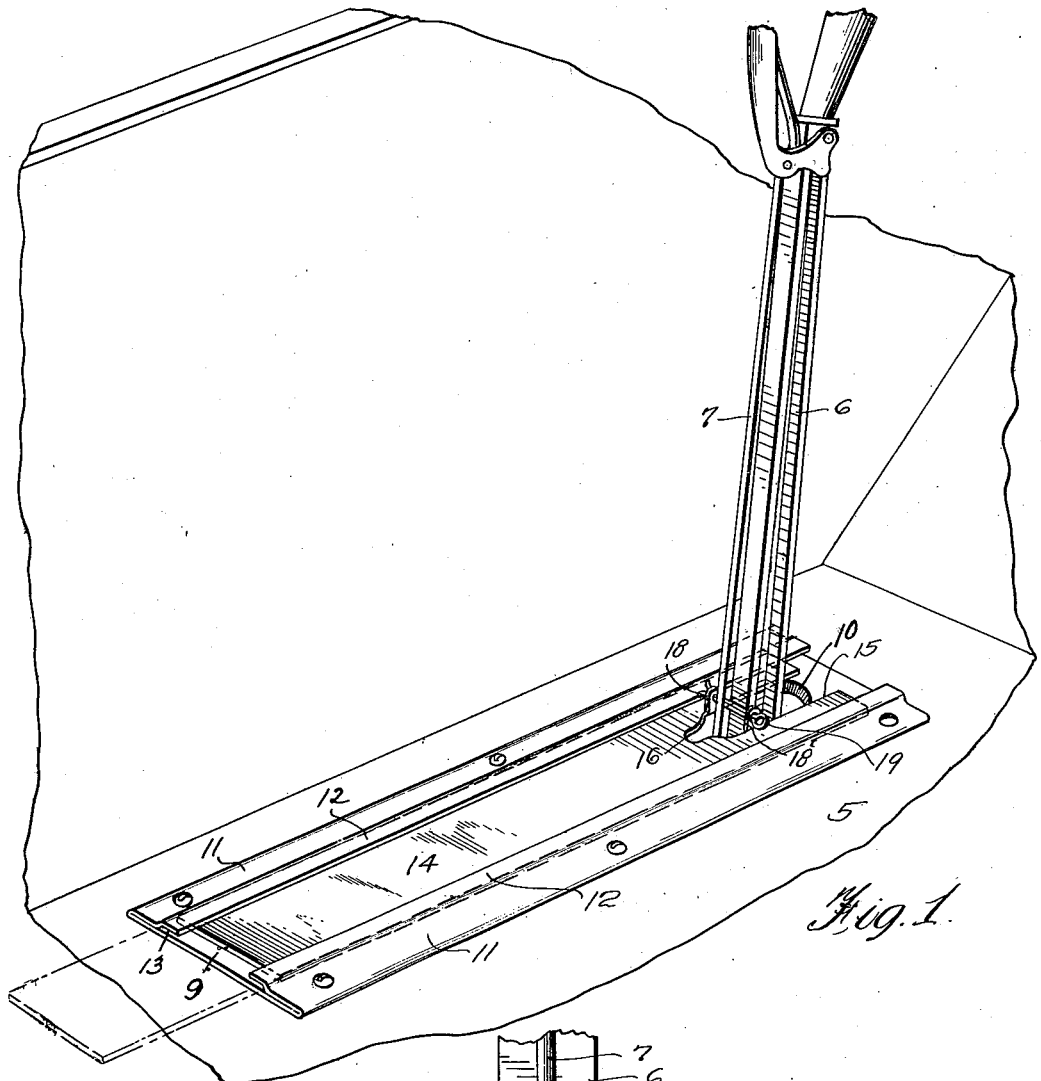
Fig. 1 is a perspective view of the device of the invention.

In the drawing 5 designates one of the ordinary floor boards of a Ford car, 6 the emergency brake lever and 7 the latch rod associated with said lever. The emergency brake lever and the latch rod operate through a slot 8 formed in the board 5. As at present constructed, the edges of this slot are reinforced by a metallic band or plate and in carrying out the invention, I substitute for such metallic band or plate a somewhat similar band or plate including a body portion 9 having a downturned flange 10 which is received within the slot 8. The metal of the plate is bent upon itself at 11 and terminates in offset horizontal flanges 12, thereby forming channels 13 within which a slidable closure plate 14 is mounted.

The closure plate 14 is longitudinally slotted at 15, at its forward end, for the reception of the emergency brake lever 6 and is notched at 16 for the reception of a latch rod 7. The metal of the plate 14 is struck upwardly to form ears 18 which receive a transverse pin 19, the latter lying between the latch rod 7 and the emergency brake 6. Thus the plate 14 is caused to partake of the movement of the lever 6 and rod 7, sliding rearwardly in the channel 13 when the emergency brake lever is pulled rearwardly to disengage the clutch and set the emergency brake and following said lever forward to the position illustrated in Fig. 1, when the car is thrown into high gear. Of course, when the lever 6 is pulled rearwardly, the forward part of the slot 8 will be uncovered but this makes no particular difference because at this time the car is unoccupied and not in motion and the entry of air through the slot at this time is not particularly objectionable. However, when the car is occupied and in motion the slot is completely closed by the plate 14 and the entry of cold blasts of air is prevented.

Figure 2:
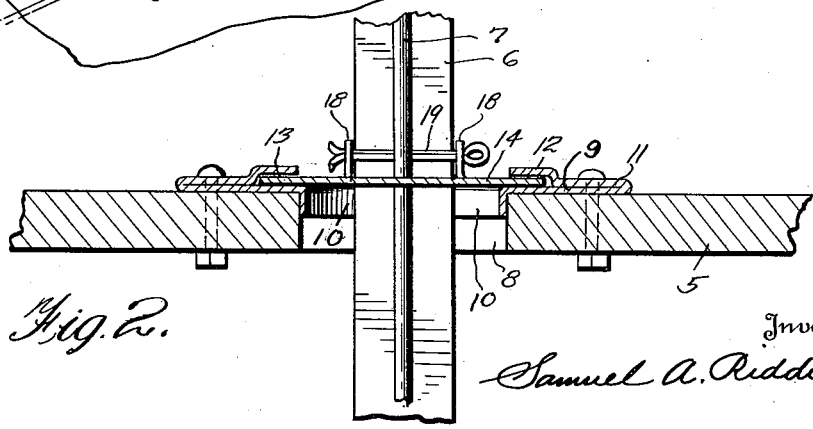
Fig. 2 is a transverse sectional view therethrough.

By referring to the sectional view, Fig. 2, it will be observed that the body portion 6, downturned flange 7, overlapped portion 11 and horizontal flanges 12 are all formed from a single piece of sheet metal struck to suitable formation. Thus it will be seen that the device may be formed of sheet metal stampings and manufactured at a very small cost.

It is to be understood that the invention is not limited to the precise construction set forth but that it includes within its purview whatever changes fairly come within either the terms or the spirit of the appended claims.

Having described my invention, what I claim is:

1. The combination with a slotted plate having longitudinal guideways formed thereon, of a closure plate operable in said guideways and a transverse element carried by said closure plate and adapted to pass between the operating lever and its latch rod to thereby cause the closure plate to move with said operating lever.

2. In combination a slotted plate formed of a single piece of sheet metal and stamped to form a horizontal body portion, a downturned flange encircling the slot therein and horizontal flanges overlying and spaced from the body portion to thereby form channels, a closure plate slidably disposed in said channels, upstanding ears struck from said closure plate and a transverse pin in said ears adapted to enter between the operating lever and its latch rod, as described.

3. In combination a plate comprising a horizontal portion and a downturned flange encircling an elongated opening formed in said body portion, offset flanges spaced from said body portion and constituting channels therebeneath, a closure plate slidably disposed in said channels, said closure plate being notched at one end for the reception of an operating lever and its associated latch rod and means carried by the closure plate for engaging said operating lever and latch rod to cause said plates to move with said operating lever and latch rod.

In testimony whereof I hereunto affix my signature.

SAM'L A. RIDDICK.